United States Patent [19]
Arikawa et al.

[11] 3,731,868
[45] May 8, 1973

[54] ONE-SIDE BACK BEAD FORMING BUTT-WELDING PROCESS USING A THERMOSETTING BACKING COMPOSITE

[75] Inventors: Masayasu Arikawa; Katsuro Iio, both of Fujisawa, Japan

[73] Assignee: Kobe Steel Ltd., Kobe, Japan

[22] Filed: Aug. 13, 1970

[21] Appl. No.: 63,643

Related U.S. Application Data

[62] Division of Ser. No. 657,197, July 31, 1967, Pat. No. 3,548,489.

[30] Foreign Application Priority Data

Aug. 4, 1966 Japan ....................41/51391

[52] U.S. Cl. ....................228/50, 29/491, 75/94, 148/23, B23k/5/22, B23k/9/02

[58] Field of Search ....................29/491; 228/50; 198/23, 24; 75/94

[56] References Cited

UNITED STATES PATENTS

| | | | |
|---|---|---|---|
| 2,320,700 | 6/1943 | Kent et al. | 228/50 X |
| 2,331,689 | 10/1943 | Hodge | 29/491 |
| 2,441,176 | 4/1948 | Wilson et al. | 228/50 X |
| 2,558,411 | 6/1951 | Austin et al. | 106/63 |
| 3,002,272 | 10/1961 | Hodges | 29/491 |
| 2,294,439 | 9/1942 | Bagley | 228/50 X |
| 2,331,937 | 10/1943 | Schreiner | 228/50 X |

*Primary Examiner*—J. Spencer Overholser
*Assistant Examiner*—Robert J. Craig
*Attorney*—Wenderoth, Lind & Ponack

[57] ABSTRACT

A powdery backing composition for use in a one-side back-bead-forming butt-welding process wherein a powdery backing composition is applied against the underside of the groove between workpieces to be welded together and said workpieces are butt-welded on the upperside of said groove, said backing composition including thermosetting resin powder, iron powder, and slag forming agent and having been initially agglomerated by the melting of said resin powder prior to the welding operation.

2 Claims, 4 Drawing Figures

2 G 2

1 3 4 5

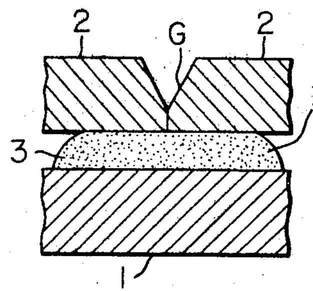
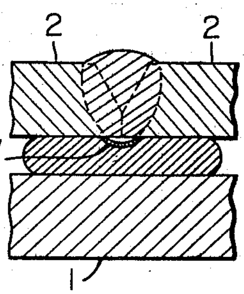
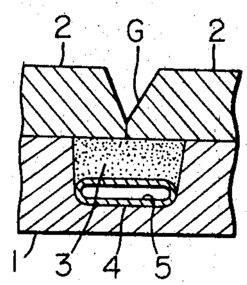
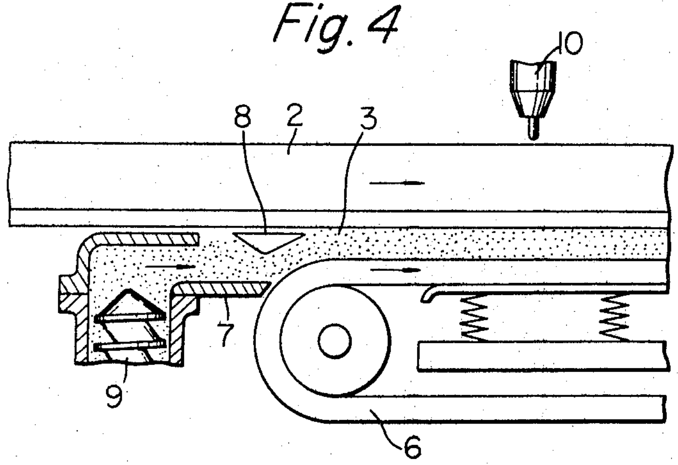
Masayasu Arikawa and
Katsuro Iio
INVENTORS
BY Wenderoth, Lind and Ponack, Attorneys

ONE-SIDE BACK BEAD FORMING BUTT-WELDING PROCESS USING A THERMOSETTING BACKING COMPOSITE

This application is a division of our copending application Ser. No. 657,197 filed July 31, 1967 now U.S. Pat. No. 3,548,489.

BACKGROUND OF THE INVENTION

In one of the prior art butt-welding processes for relatively large and/or thick steel workpieces, generally, two steel workpieces are first aligned edge to edge leaving a predetermined space or groove between their opposite edges where metal is to be deposited and a welding operation is performed on the upperside of the groove. After the upperside of the groove has been welded, the workpieces are then reversed so as to make the yet-to-be welded underside of the workpieces the top and thereafter, the workpieces are welded on the present upperside of the groove repeating the same procedure which was followed in welding the first upperside of the groove. However, the reversing of such heavy workpieces in the course of the welding operation is rather troublesome and this fact presents a grave impediment to the automation of various processes for welding large size and/or thick workpieces.

In building or assembling ships, bridges, storage tanks and the like huge structures, the so-called one side butt welding process has been proposed and practiced by some people in the industry. According to this process, steel plates are welded on only one side thereof so as to form back beads on the other or opposite side of the workpieces. However, such a welding process has been exclusively performed by directing the welding rods downward. At present, when the welding operation is performed along curved sections of workpieces and the upward welding operation is performed, a combination of gouging and back bead forming welding has been relied upon. Although the one-side back-bead-forming welding process has been practiced by some people in the industry for welding curved sections of workpieces or welding the workpieces from the lower portions to the upper portions thereof with the use of hand welding rods for back-bead forming, such process has presented various problems, for example, it is difficult to obtain precisely defined grooves between workpieces, proper seams of beads, and skilled workers, and therefore, the process has not been yet commonly and widely practiced in the industry.

Of late, improved side butt-welding processes for relatively large and/or thick steel workpieces have been developed. In one of these newly developed one side butt-welding processes, as a preparatory step, two steel workpieces are aligned edge to edge with a space or groove formed between their opposite edges where metal is to be deposited and a copper alloy backing block is applied against the underside of the workpieces at the bottom of the groove and then, the workpieces are butt-welded from the upperside of the groove. In another newly developed one side butt-welding process, two steel workpieces are aligned in the manner as described above and a suitable powdery backing composition is disposed on the underside thereof at the bottom of the groove and then the workpieces are butt-welded from the upperside of the groove. However, both of these newly developed one side butt-welding processes have inherent disadvantages; that is, in the one side butt-welding process using the copper alloy backing block, if there is any clearance or clearances between the steel workpieces and the backing strip, molten metal flows into the clearance or clearances and a fin or fins are caused to form in the clearance or clearances and in addition, slag may be incorporated into the molten metal. Furthermore, since both the steel workpieces and the copper alloy backing strip are rigid bodies, if the workpieces have ragged portions and/or curvatures on their underside the backing block often does not contact the underside of the workpieces to be welded together evenly. In addition, should the copper alloy backing block be a grooved block, there is the possibility of insufficient depth of penetration due to flow of molten metal into the groove of the backing block and forming metal deposits, overlaps, undercuts and the like in the backing block groove.

On the other hand, the one side butt-welding process using the powdery backing composition is superior in some aspects to the one side butt-welding process using the copper alloy backing block, but even when the powdery backing composition-type one side butt-welding process is employed, it is not easy to at all times insure that the backing composition can positively and uniformly contact at all the points of the underside of the workpieces.

SUMMARY OF THE INVENTION

The present invention relates to a powdery backing composition for use in one side butt-welding processes for steel workpieces, and more particularly large size and/or thick steel workpieces such as parts of vessels, buildings, bridges and other steel constructions. Such steel workpieces which are aligned edge to edge with a groove formed between their opposite edges and with a backing composition disposed at the bottom of the groove and held against the workpieces by means of a supporting member are welded from their upperside.

One object of the present invention is to provide a powdery backing composition for use in a one-side back-bead-forming butt-welding process which can be applied to both curved surface welding and upward welding as well as to downward welding.

Another object of the present invention is to provide a powdery backing composition for use in a one-side back-bead-forming butt-welding process which, when applied to downward welding, can be performed with the use of jigs and devices which are lighter in weight and smaller in size than those which were necessary for any prior art one-side back-bead-forming butt-welding process.

Another object of the present invention is to provide a powdery backing composition for use in a one-side back-bead-forming butt-welding process in which, when applied to curved surface and upward welding, the process can be performed without the necessity for precisely forming a groove between workpieces and for high degree of skill on the part of workers but can form a smooth and continuous back bead.

A further object of the present invention is to provide a powdery backing composition for use in a one-side back-bead-forming process in which even when any irregular groove between workpieces is welded, there is no possibility of deposit metal falling and/or dripping down from the welded groove.

A further object of the present invention is to provide a powdery backing composition for use in a one-side back-bead-forming butt-welding process in which even when the workpieces are welded from only one side, a satisfactory back bead appearance can be obtained and a backing block which upholds a backing composition in contact with the underside of workpieces can be protected from an electric arc.

A further object of the present invention is to provide a powdery backing composition which is able to be positively held against the workpieces when the upward and curved surface welding operations are performed on the workpieces.

The welding process employing the powdery backing composition of the present invention is distinguished from the prior art butt-welding processes in which steel workpieces aligned to be joined together are preheated and then a backing composition which has been held against the underside of the workpieces at the bottom of the groove between the workpieces in a powdery form is heated so as to have the composition solidify and positively adhere to the workpieces. In the welding process employing the powdery backing composition of the present invention it is not necessary to preheat the workpieces. A novel powdery backing composition of the present invention contains a slag forming agent, thermosetting resin powder and iron powders and it is applied against the underside of the steel workpieces at the bottom of the groove between the workpieces and firmly held in position by a backing block which holds the composition up from the bottom. Thereafter, an electric arc welding operation is initiated from the upperside of the workpieces along the groove or weld line.

The composition of the present invention is applicable to the one-side butt-welding of steel work pieces of any chemical composition, any thickness and/or sizes; that is, the workpieces may be carbon steels or steel alloys having different chemical compositions and varying thicknesses and/or sizes. In addition, in such welding the weld line or groove where metal is to be deposited by the butt-welding may be straight, curved or any combination of curved and straight sections. And the welding position may be horizontal, vertical or slanted. However, the opposite edges of workpieces to be butt-welded preferably form a beveled groove which has a V-section, a Y-section or an I-section. The grooves need not have an open bottom or root, but an opening up to 10 mm at the bottom or root of the groove is workable. In some cases, the workpieces to be welded together may be of different thicknesses, or the workpieces may be laid and welded at different heights from each up to 3 mm. The backing block to be employed in performing the process employing the composition of the present invention may be and is usually formed of a aluminum, aluminum alloys, copper or copper alloys. The backing block for such welding preferably has as small a thickness as possible and the thickness of the backing block is selected depending upon the length of the weld line between the workpieces to be butt-welded. The configuration of the backing block is also determined in conformity with the specific configuration of the weld line (straight or curved configuration). The backing block may be a plain plate or a plate having a longitudinal groove on one side extending along the direction in which the weld line extends when the block is applied on the underside of the workpieces. Thus, the groove formed on the backing composition supporting side on the backing block can conveniently receive a backing composition thereon. The groove to be formed on the backing block side has capacity enough to receive a predetermined amount of a backing composition which may be determined depending upon specific factors involved in the butt-welding operation to be performed, but usually the backing block groove is shallow and wide. The upper edges of the opposite side walls of the backing block groove are preferably inwardly bent so that the backing composition will not come out of the groove.

The slag forming agent to be contained in the backing composition employed is not limited to only an agent which has a specific grain size, but may be any one selected from those which have been conventionally employed as the slag forming agents in the conventional backing compositions for welding purposes. The slag forming agents to be employed the backing composition in may be fluxes which have been commonly employed for conventional welding. One typical prior art flux is comprised of oxides such as $SiO_2$, $Al_2O_3$, $TiO_2$, $ZrO_2$, MgO, CaO and BaO in a powdery form, halide such as $CaF_2$ in a powdery form, metallic carbonates such as $CaCO_3$, $BaCO_3$ and $MgCO_3$ in a powdery form and Fe, Fe-Si, Fe-Mn, Fe-Ti and Fe-Al in a powdery form. The above flux or slag forming agent is preferably employed in at least 9 percent by weight based on the weight of the total backing composition. Preferably, iron powder is also added to the backing composition in a suitable amount. The amount of iron powder to be added to the backing composition may vary within a range of 10 – 90 percent by weight based on the weight of the total backing composition and in some cases the additive iron powder may be in a form of an iron alloy containing another metallic constituent or constituents. As the welding operation proceeds, the additive iron powder in the backing composition forms a wave-shaped back bead line at the bottom of the groove being welded while the slag forming agent in the same backing composition gives a fine appearance to the surface of the thus formed wave-shaped back bead line.

As the welding operation proceeds, the additive iron powder melts together with the slag forming agent within the backing composition and the molten iron powder forms a wave-shaped back bead line on the underside of the workpieces along the bottom of the weld line or groove being welded. The supply of metal from the molten backing composition is quite effective in carrying out the novel one side back bead forming butt-welding process because the molten iron powder merges into the molten metal from the other constituents of the backing composition and thereby the amount of metal deposited on the workpieces is increased.

As pointed hereinabove, by employing the novel backing composition with the use of the present invention, with the use of large and/or thick steel workpieces can be butt-welded from just the upper side thereof with the backing composition held against the opposite or underside of the workpieces without the necessity for reversing the workpieces because the molten backing composition provides deposit metal on the underside of the workpieces and a high quality weld can be obtained without such disadvantages as insufficient deposition of metal, overlaps and undercuts which have been inevitable in performing the prior art one side butt-welding processes.

The thermosetting resin to be contained in the backing composition is a binding agent which melts and solidifies the other principal backing composition constituents when the resin is heated to a temperature up to 450°C. Examples of the binding agents to be employed in the backing composition are phenol resin, epoxy resin and isocyanate. The temperature to which the thermosetting resin is heated is limited to 450°C because, if the thermosetting resin is heated above the specified temperature, the organic ingredient or ingredients of the resin are carbonized whereby the flux solidified by the resin or binding agent may be rendered fragile. The amount of the resin to be employed as the binding agent for the principal constituents of the backing composition can not be strictly defined by any numerical value; it can be merely said that the resin may be used in an amount sufficient to solidify the principal backing composition constituents. When the binding agent is a thermosetting resin, generally, the amount of the binding agent is preferably within the range of 0.2 to 4.0 percent by weight based on the weight of the total backing composition.

While the backing composition of the present invention is primarily intended to be used in a powdery form received in the groove on the backing block and to be solidified as the welding operation progresses to provide a satisfactory back bead, the solidification being effected by the heat generated by the welding process, the backing composition received in the groove on the backing block may be heated before the welding operation is initiated or during the welding operation as desired.

When the backing composition is heated during a welding operation, the heat generated by the welding operation is utilized as the heat source for solidifying the backing composition. In this case, the backing composition is preheated by the heat transferred from a point in the groove where the welding was initiated whereby the resin content in the backing composition is first melted so as to render the principal powdery backing composition constituents into an agglomerated state whereupon the whole backing composition can firmly adhere properly and uniformly to the workpieces to be joined together, following the contour of the workpieces being welded resulting in a decrease of the formation of fines attributable to the flowing out of molten metal and in the formation of a uniform wave-shaped back bead on the underside of the workpieces at the bottom of the groove.

Furthermore, since the powdery backing composition has been previously agglomerated as a result of the melting of the resin powder contained in the backing composition, the composition can be effectively compressed by the weight and expansive force of an air hose which is disposed within the groove in the backing block over the backing composition when the hose is supplied with compressed air, and as a result, the backing composition is caused to agglomerate just before the welding of workpieces thereby ensuring close contact of the composition with the workpieces and preventing fins from being formed on the weld. In addition, the formation of the slag is effective in providing a quite smooth and uniform wave-shaped back bead line.

The final pass which is to be performed on the top-side groove in carrying out the one-side butt-welding process may be made by any of the conventional processes—hand welding, semi-automatic welding, and automatic welding (carbonic acid gas-shielded welding, inert gas-shielded welding, sub-merged arc welding, electro-slag welding and non-shielded welding), but in any of the above-mentioned processes the welding rod to be employed should be a consumable wire electrode. The above-mentioned various welding processes may be suitably selected depending upon the welding conditions such as voltage, amperage and velocity.

BRIEF DESCRIPTION OF THE DRAWINGS

FIGS. 1 through 4 are fragmentary views in section illustrating different arrangements with which the one-side back-bead-forming butt-welding process employing the backing composition of the present invention is carried out.

PREFERRED EMBODIMENTS OF THE INVENTION

Referring now to the Figs. of the accompanying drawings, and more particularly to FIG. 1 thereof, two steel workpieces 2 and 2 having opposing bevelled edges are shown as being aligned edge to edge in the same plane so as to define a Y-shaped groove G between their opposing bevelled edges. A suitable backing composition 3 is disposed on the underside of the workpieces 2 right below the groove G covering an area at and in the vicinity of the bottom of the groove. The backing composition 3 is held against the underside of the workpieces 2 and 2 from below by means of a suitable backing block 1 which is in turn upheld by a conventional base construction disposed below the block (not shown). Thus, it will be understood that the backing composition 3 is held in position in a compressed condition between the workpieces 2 and 2 and the supporting unit comprising the backing block 1 and conventional base construction by the weight of the workpieces and the cooperating supporting action of the upholding unit.

When it is desired to obtain a more positive or effective contact of the backing composition 3 with the workpieces 2 and 2, the arrangement as shown in FIG. 3 is preferably employed. In this arrangement, the backing block 3 is formed on the upper surface thereof with a longitudinal recess 4 which extends along the bottom of the groove G when the backing block is disposed on the underside of the workpieces and an air hose or an air bag 5 is disposed within and along the longitudinal recess 4. The backing composition 3 is filled within the block recess 4 over the air hose 5. With this arrangement, when the air hose 5 is supplied with compressed air from a suitable compressed air supply source (not shown), so as to expand the hose, the expanded air hose 5 pushes up and compresses the backing composition 3 against the workpieces 2 and 2 whereby the pushed-up and compressed backing composition 3 can be positively abutted against the underside of the workpieces 2 and 2 at the bottom of the groove G resulting in close contact of the composition with the workpieces. The arrangement of FIG. 3 is particularly preferable when the workpieces 2 and 2 are relatively great in thickness and light in weight.

If the one-side butt-welding process is carried out while the workpieces 2 and 2 are advancing through the welding station in a welding system, an arrangement as shown in FIG. 4 is employed. In such an arrangement, an endless belt 6 is employed in place of the stationary backing block 1 shown in FIGS. 1 through 3. A lower backing composition receiving or guide member 7 and an upper scraper 8 are provided in the vicinity of one or the inlet end of the belt 6. A backing composition feeder 9 in a screw form is provided on the side of the receiving member 7 opposite the belt 6. With the above arrangement, when the feeder 9 is operated or rotated by a suitable conventional drive means (not shown), the feeder 9 continuously feeds the backing composition 3 upward in a controlled rate through the receiving member 7 onto the moving belt 6. The backing composition 3 may be conveyed on the belt 6 in a controlled amount or thickness and therefore, a constant or controlled thickness of backing composition layer is at all the times present between the workpieces 2 and 2 and the belt 6. Thus, the butt-welding process can be automatically carried out by manipulating a welding torch 10 disposed in a suitable operative position with respect to the workpieces while the workpieces are advancing through the welding station.

The following are examples in which the one-side back-bead-forming butt-welding process were successfully carried out by employing the powdery backing composition of the present invention.

EXAMPLE 1

Two 400 × 600 mm steel workpieces were cut from a killed mild steel plate stock having a thickness of 32 mm and one edge of each workpiece was bevelled so as to form a Y-shaped groove (50°) having a depth of 5 mm when the workpieces are aligned with their bevelled edges facing each other. The workpieces were placed on a backing block with a backing composition interposed between the workpieces and the backing block as shown in FIG. 1.

The backing composition employed comprised the following constituents by weight percentage:

| | |
|---|---|
| Sub-merged arc welding flux (G. 20) | 43.0% |
| Iron powder (less than 10 mesh) | 35.0% |
| Ferrosilicon | 17.5% |
| Phenol resin powder | 4.5% |

The above-mentioned backing composition was spread over the backing block in a width of 60 mm and a thickness of 25 mm at and in the vicinity of the bottom of the groove between the workpieces. Using a length of mild steel wire electrode having a diameter of 6.4 mm (U.S. 43) and sub-merged arc welding flux (P.F.11. — 45, 10 – 48 mesh), a tandem welding operation was performed in accordance with the conventional sub-merged arc welding process.

The welding conditions were:

Leading pass 1200 A × (30 – 34)V × 30 cm/min.

Trailing pass 1300 A × (34 – 36)V × 30 cm/min.

X-ray examination of the butt-welded portion or metal deposited portion of the workpieces indicated that the metal deposit was of a first grade quality when determined in accordance with JIS criteria. The wave-shaped back bead line was smooth and uniform having a width of 12 mm and a height of 1.5 mm and no slag was found in the back bead. In addition, no undercuts were found in the back bead line.

TABLE

The constituents of Flux G. 20 and Flux P.F.H. — 45 (by weight part)

| | G. 20 | P.F.H. — 45 |
|---|---|---|
| $SiO_2$ | 54.52 | 20.0 |
| $Al_2O_3$ | 3.81 | 10.0 |
| FeO | 1.03 | trace |
| $TiO_2$ | 0.20 | trace |
| CaO | 31.82 | 20.0 |
| MgO | 9.24 | 40.0 |

The invention has been described in detail with particular reference to preferred embodiment thereof, but it will be understood that variations and modifications can be effected within the spirit and scope of the invention.

What is claimed is:

1. A weld backup means for a one side back-bead-forming butt-welding process comprising a powdery backing composition consisting of a mixture of a conventional powder welding flux, thermosetting resin and iron powder, said thermosetting resin being within the range of 0.2 to 4.0 percent by weight based on the total weight of the composition, said conventional flux being over 9 percent by weight based on the total weight of the composition, said composition having the property of being agglomerated by the melting of said resin during the welding process by the heat thereof; and means for positioning said powdery backing composition against the elements to be welded.

2. A weld backup means as claimed in claim 1, wherein said iron powder is included in an amount of 10 to 90 percent by weight based on the total weight of the composition.

* * * * *

UNITED STATES PATENT AND TRADEMARK OFFICE

Certificate

Patent No. 3,731,868 Patented May 8, 1973

Masayasu Arikawa and Katsuro Iio

Application having been made by Masayasu Arikawa and Katsuro Iio, the inventors named in the patent above identified, and Kobe Steel Ltd., Kobe, Japan, the assignee, for the issuance of a certificate under the provisions of Title 35, Section 256, of the United States Code, adding the names of Motomi Kano and Naoki Okuda as joint inventors, and a showing and proof of facts satisfying the requirements of the said section having been submitted, it is this day of June 24, 1975, certified that the names of Motomi Kano and Naoki Okuda are hereby added to the said patent as joint inventors with the said Masayasu Arikawa and Katsuro Iio.

FRED W. SHERLING,
*Associate Solicitor.*